United States Patent
Le et al.

(10) Patent No.: US 9,524,171 B1
(45) Date of Patent: *Dec. 20, 2016

(54) SPLIT-LEVEL HISTORY BUFFER IN A COMPUTER PROCESSING UNIT

(71) Applicant: International Business Machines Corporation, Armonk, NY (US)

(72) Inventors: Hung Q. Le, Austin, TX (US); Dung Q. Nguyen, Austin, TX (US); David R. Terry, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/091,788

(22) Filed: Apr. 6, 2016

Related U.S. Application Data

(63) Continuation of application No. 14/740,694, filed on Jun. 16, 2015.

(51) Int. Cl.
*G06F 9/38* (2006.01)

(52) U.S. Cl.
CPC ........... *G06F 9/3863* (2013.01); *G06F 9/3802* (2013.01); *G06F 9/3855* (2013.01); *G06F 9/3861* (2013.01)

(58) Field of Classification Search
CPC .... G06F 9/3855; G06F 9/3861; G06F 9/3863; G06F 9/00–9/3897; G06F 12/00–12/16
USPC .......................................................... 712/228
See application file for complete search history.

(56) References Cited

U.S. PATENT DOCUMENTS

| | | | | |
|---|---|---|---|---|
| 5,163,140 A | * | 11/1992 | Stiles | G06F 9/3804 711/120 |
| 5,355,457 A | * | 10/1994 | Shebanow | G06F 9/3836 712/217 |
| 5,450,560 A | * | 9/1995 | Bridges | G06F 5/10 708/211 |
| 5,557,763 A | * | 9/1996 | Senter | G06F 9/3004 711/140 |
| 5,581,775 A | * | 12/1996 | Katz | G06F 9/3863 711/200 |

(Continued)

OTHER PUBLICATIONS

Loew, J., and Ponomarev, D. Two-Level Reorder Buffers: Accelerating Memory-Bound Applications on SMT Architectures, 37th International Conference on Parallel Processing (ICPP '08), 2008; 8 pages.*

(Continued)

*Primary Examiner* — Keith Vicary
(74) *Attorney, Agent, or Firm* — Erik K. Johnson

(57) ABSTRACT

A split level history buffer in a central processing unit is provided. A history buffer is split into a first portion and a second portion. An instruction fetch unit fetches and tags instructions with unique tags. A register file stores tagged instructions. An execution unit generates results for tagged instructions. A first instruction is fetched, tagged, and stored in an entry of the register file. A second instruction is fetched and tagged, and then evicts the first instruction from the register file, such that the second instruction is stored in the entry of the register file. Subsequently, the first instruction is stored in an entry in the first portion of the history buffer. After a result for the first instruction is generated, the first instruction is moved from the first portion of the history buffer to the second portion of the history buffer.

1 Claim, 6 Drawing Sheets

(56) References Cited

U.S. PATENT DOCUMENTS

| | | | | |
|---|---|---|---|---|
| 5,870,612 | A * | 2/1999 | Cheong | G06F 9/3836 710/260 |
| 5,887,161 | A * | 3/1999 | Cheong | G06F 9/3836 712/228 |
| 6,070,235 | A | 5/2000 | Cheong et al. | |
| 6,163,839 | A * | 12/2000 | Janik | G06F 9/3836 712/218 |
| 6,629,233 | B1 * | 9/2003 | Kahle | G06F 9/3013 712/217 |
| 6,633,970 | B1 | 10/2003 | Clift et al. | |
| 7,783,870 | B2 * | 8/2010 | Levitan | G06F 9/3804 712/237 |
| 2001/0047467 | A1 * | 11/2001 | Yeh | G06F 9/3844 712/228 |
| 2004/0017723 | A1 | 1/2004 | Stubbs et al. | |
| 2004/0064679 | A1 * | 4/2004 | Black | G06F 9/3836 712/214 |
| 2005/0050304 | A1 * | 3/2005 | Mukherjee | G06F 9/3851 712/218 |
| 2006/0242392 | A1 | 10/2006 | Elwood | |
| 2008/0195850 | A1 * | 8/2008 | Abernathy | G06F 9/3802 712/240 |
| 2011/0167247 | A1 * | 7/2011 | Gibbs | G06F 9/30054 712/240 |
| 2012/0072700 | A1 | 3/2012 | Abernathy et al. | |
| 2013/0151818 | A1 | 6/2013 | Barak et al. | |
| 2013/0238858 | A1 * | 9/2013 | Greenhalgh | G06F 9/3814 711/125 |
| 2015/0006848 | A1 | 1/2015 | Hinton et al. | |
| 2015/0095627 | A1 * | 4/2015 | Dechene | G06F 9/30145 712/228 |

OTHER PUBLICATIONS

J. E. Smith and A. R. Pleszkun. Implementing Precise Interrupts in Pipelined Processors. IEEE Transactions on Computers, vol. 37, No. 5, pp. 562-573, May 1988.*

Slater (AMD's K5 Designed to Outrun Pentium) Microprocessor Report; MicroDesign Resources; vol. 8, No. 14; Oct. 24, 1994; 7 pages.*

IBM, List of IBM Patents or Patent Applications Treated as Related, Appendix P, dated Jun. 14, 2016, 2 pages.

Pending U.S. Appl. No. 14/740,694, filed Jun. 16, 2015, entitled: "Split-Level History Buffer in a Computer Processing Unit", pp. 1-35.

* cited by examiner

SPLIT-LEVEL HISTORY BUFFER IN A COMPUTER PROCESSING UNIT

BACKGROUND OF THE INVENTION

The present invention relates generally to the field of data processing systems, and more particularly to history buffers in a central processing unit.

Central processing units (CPUs) may implement multi-threaded core technologies that involve one or more execution lanes. Each execution lane utilizes a register file (RF) and history buffer (HB) that contains architected register data. Instructions are tagged by the order in which they were fetched. Once the instructions are fetched and tagged, the instructions are then executed to generate results, which also are tagged. The RF may contain results from the most recently executed instructions (i.e., newer register data) and the HB may contain results from previously executed instructions (i.e., older register data). Furthermore, the older register data is displaced by newer register data from one or more entries in the RF to one or more entries of the HB. In some instances, a limited number of entries in the HB may reach a memory capacity and impact CPU performance. Furthermore, the HB and RF are implemented by CPUs to manage architected register data, complete register data, restore register data, and recover register data.

SUMMARY

Embodiments of the present invention provide a system, a method, and a computer program product for a split level history buffer in a central processing unit. A history buffer is split into a first portion and a second portion. An instruction fetch unit fetches and tags an instruction with a unique tag. A register file stores the instruction fetched and tagged by the instruction fetch unit. An execution unit generates a result for a tagged instruction. A first instruction is fetched. The first instruction is tagged. The first instruction is stored in an entry of the register file. A second instruction is fetched. The second instruction is tagged. The first instruction is evicted from the entry of the register file and the second instruction is stored in the entry of the register file. Responsive to evicting the first instruction, the first instruction is stored in an entry in the first portion of the history buffer. A result for the first instruction is generated. Responsive to generating the result for the first instruction, the first instruction is moved from the first portion of the history buffer by storing the first instruction including the generated result for the first instruction in the second portion of the history buffer. Whether a third instruction evicts the second instruction from the entry of the register file is determined. Responsive to determining that the third instruction evicts the second instruction from the entry of the register file, the second instruction is stored in the first portion of the history buffer.

DETAILED DESCRIPTION

Embodiments of the present invention provide efficient and cost-effective systems and methods for managing architected register data within computing processing units. Embodiments of the present invention can help increase a total number of history buffer entries in a circuit containing architected register data. Furthermore, embodiments of the present invention may be used to reduce a circuit area required for the total number of history buffer entries.

Figure 1:
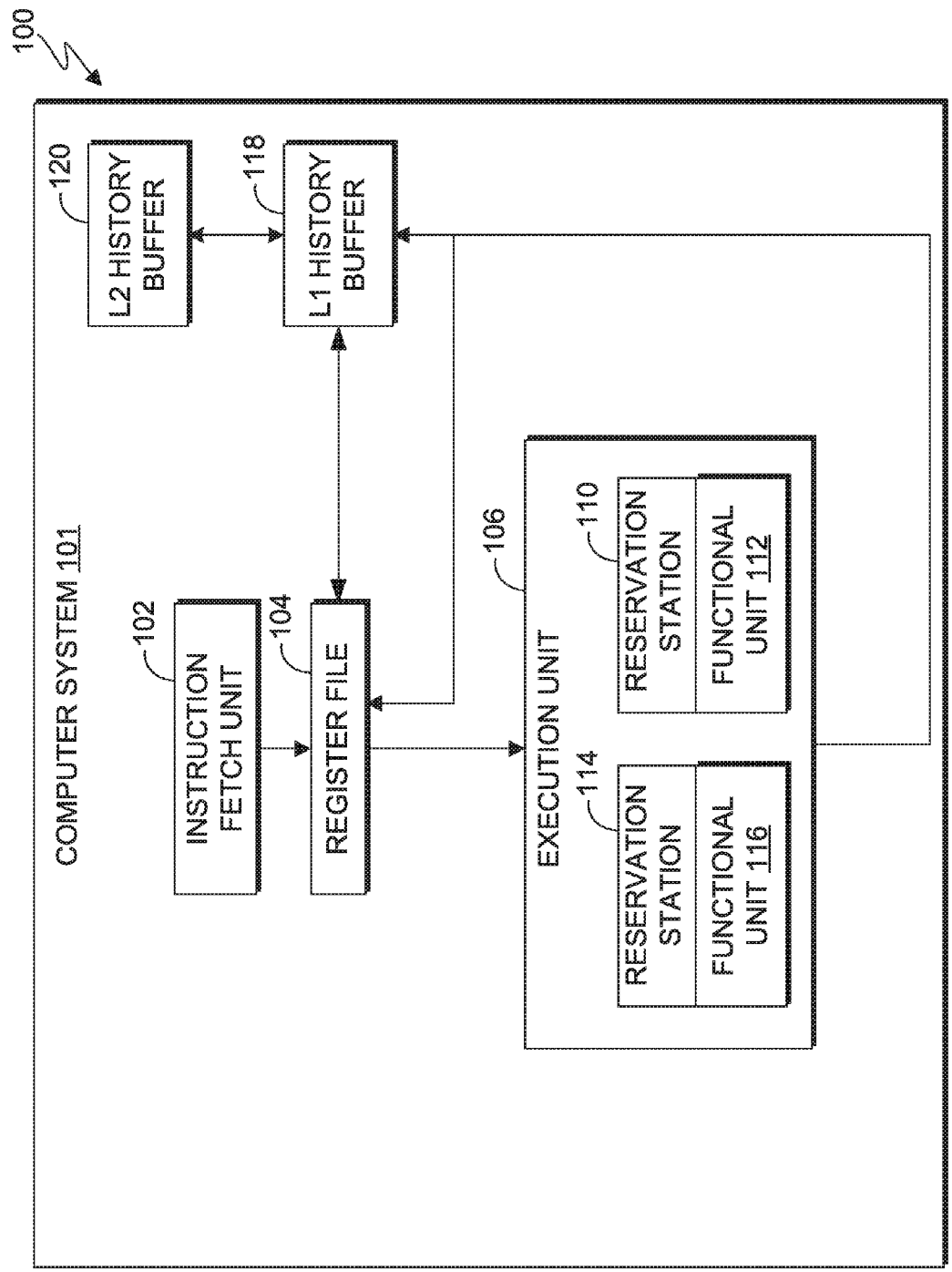
FIG. 1 is a functional block diagram of a computing environment, in accordance with an embodiment of the present invention.

FIG. 1 is a functional block diagram of computing environment 100, in accordance with an embodiment of the present invention. In an embodiment, computing environment 100 includes computer system 101. Furthermore, computer system 101 includes instruction fetch unit 102, register file 104, execution unit 106, L1 history buffer (HB) 118, and L2 HB 120. It should be understood that additional components may be implemented by computer system 101 that perform operations (e.g., arithmetic, logical, control, input/output (I/O), etc.) to facilitate CPU functionality that may not be depicted in FIG. 1 or discussed herein. It should be understood that computing environment 100 may contain computer system 101, more than one computer system 101, a network, other devices (not shown), etc. In general, embodiments of the present invention may be performed by a computer system (e.g., computer system 101), or by a module performing operations on the computer system.

Instruction fetch unit 102 fetches one or more instructions from program memory (not depicted). Subsequently, instruction fetch unit 102 transmits the one or more fetched instructions and a unique multi-bit ITAG (i.e., a mechanism used to tag or identify instructions) tagging each of the one or more fetched instructions to register file 104. Each of the one or more fetched instructions are represented by a numeric string describing an operation for computer system 101 to execute. In an embodiment, instruction fetch unit 102 uses a program counter (not depicted) to tag each of the one or more fetched instructions. For example, three instructions fetched from program memory may be tagged by three unique multi-bit ITAG's indicating an order in which the three instructions were fetched. In certain embodiments, instruction fetch unit 102 may include a decoding component which can partition each of the one or more fetched instructions into one or more portions (e.g., opcode, operands, etc.) for subsequent execution. Furthermore, the decoding component of instruction fetch unit 102 may enable computer system 101 for branch prediction.

Register file 104 contains the one or more fetched instructions prior to dispatching each of the one or more fetched instructions to execution unit 106. In an embodiment, register file 104 is an array of processor registers having one or more entries available to store the one or more fetched instructions. As previously discussed, each of the one or more fetched instructions are tagged with a unique ITAG. Accordingly, each entry of register file 104 contains at least, a fetched instruction tagged by an ITAG and the ITAG. Entry data of an entry in register file 104 may be evicted to L1 HB 118 or L2 HB 120, as described in greater detail with regard to FIG. 2. Furthermore, contents of an entry of register file 104 may also include result data, as described in greater detail with regard to FIG. 3. In one embodiment, more than one register file 104 may be implemented by computer system 101 and configured as a register bank. In another embodiment, register file 104 may be implemented with computer system 101 and components therein configured for register renaming.

Execution unit 106 produces and generates a result for each of the one or more tagged instructions dispatched by register file 104. In an embodiment, execution unit 106 generates a result for a tagged instruction by performing operations and calculations specified by opcode (i.e., operation code) of the tagged instruction. Execution unit 106 includes functional unit 112 and functional unit 116 which correspond to reservation station 110 and reservation station 114, respectively. In one embodiment, execution unit 106 and components therein are each connected, such that each component is configured to perform at least a portion of a desired operation during a clock cycle.

Reservation stations 110 and 114 enable computer system 101 to process and execute instructions out of order. Furthermore, computer system 101 implements reservation stations 110 and 114 to improve parallel execution of instructions. For example, reservation stations 110 and 114 permit computer system 101 to fetch and re-use a data value once the data value has been computed by functional unit 112 and/or functional unit 116. In this instance, computer system 101 uses reservation stations 110 and 114 so that computer system 101 does not have to wait for a data value to be stored in HB 118 (and in some instance register file 104) and re-read. In an embodiment, reservation stations 110 and 114 are connected to functional unit 112 and 116, respectively for dynamic instruction scheduling (i.e., used by Tomasulo algorithm). Furthermore, reservation stations 110 and 114 may enable computer system 101 to have advanced capabilities for processing and executing one or more tagged instructions, such as register renaming. Reservation stations 110 and 114 may contain necessary logic used to determine a manner to execute a tagged instruction once the tagged instruction is dispatched from register file 104.

Functional units 112 and 116 output result data for tagged instructions dispatched from register file 104. In an embodiment, functional unit 112 executes the tagged instruction to generate a result for the tagged instruction. Furthermore, functional unit 116 executes the other tagged instruction in accordance to generate another result for the other tagged instruction. In an embodiment, functional units 112 and 116 are components (e.g., adders, multipliers, etc.) connected to reservation stations 110 and 114, respectively. For example, functional units 112 and/or 116 may be arithmetic logic units (ALUs). In another example, functional units 112 and/or 116 may be floating-point units (FPU). Furthermore, functional units 112 and 116 may generate a plurality of results in parallel, independently, and/or sequentially. It should be understood that a greater or lesser number of functional units 112 and 116 and reservation stations 110 and 114 may be implemented by computer system 101, in accordance with an embodiment of the invention.

L1 HB 118 and L2 HB 120 are a part of a split-level history buffer containing one or more entries storing entry data from register file 104. It should be understood that the split-level history buffer (i.e., L1 HB 118 and L2 HB 120) is a history buffer that has been partitioned into two portions to effectively increase a number of entries in the split-level history buffer containing one or more tagged instructions and additional information for the each of the one or more tagged instructions. Computer system 101 utilizes L1 HB 118 and L2 HB 120 to store one or more tagged instructions and additional information for each of the one or more tagged instructions. Accordingly, entry data evicted from register file 104 are stored in L1 HB 118 and L2 HB 120 prior to computer system 101 performing a subsequent action (e.g., completion, flushing, restoration, etc.). Computer system 101 utilizes logic and other signals to ensure that L1 HB 118 and L2 HB 120 contain evicted entry data in a correct chronological order. Furthermore, L1 HB 118 and L2 HB 120 can be a space-efficient component utilized to increase a number of entries for storing evicted data from register file 104.

L1 HB 118 is a first-level history buffer with one or more entries containing evicted entry data. In an embodiment, evicted entry data are transmitted from register file 104 to L1 HB 118 responsive to an eviction operation, as described in greater detail with regard to FIG. 2. In one embodiment, each entry of L1 HB 118 containing evicted entry data includes at least an ITAG for a first tagged instruction, the first tagged instruction, an evictor ITAG, and additional status bits (i.e., information describing completion status, flushing, etc.). The phrase "evictor ITAG," as used herein, refers to an ITAG for a second tagged instruction that evicted entry data from an entry of register file 104 to an entry of L1 HB 118. For example, an entry of register file 104 may contain "ITAG A," and a tagged instruction, "instruction A," for an instruction fetched at a first time. Furthermore, instruction fetch unit 102 may fetch a second instruction at a second time, "instruction B" tagged with "ITAG B." In this instance, instruction fetch unit 102 may dispatch "instruction B" and "ITAG B" to the entry containing "ITAG A" and "instruction A." Furthermore, the older data in the entry of register file 104 (i.e., "ITAG A" and "instruction A") is evicted by newer data (i.e., "ITAG B" and "instruction B") to a designated entry of L1 HB 118. Accordingly, the designated entry now contains "ITAG A," "instruction A," and the evictor ITAG, "evictor ITAG B." In certain embodiments, an entry of L1 HB 118 may also contain result data generated from execution unit 106, as described in greater detail herein.

L2 HB 120 is a second-level history buffer with one or more entries containing completed data (i.e., result data for a tagged instruction is coupled to an entry containing the tagged instruction). In one embodiment, L1 HB 118 may transmit completed data during a completion process, as described in greater detail with regard to FIG. 5. In another embodiment, register file 104 may transmit completed data directly to L2 HB 120 (not depicted). For example, execution unit 106 may generate a result for a tagged instruction, wherein the tagged instruction is stored in an entry of either register file 104 or L1 HB 118. Furthermore, execution unit 106 updates the entry storing the tagged instruction by coupling the result for the tagged instruction to the entry. Accordingly, computer system 101 transmits the updated entry data to L2 HB 118 which is used for subsequent operations (e.g., flushing, restoring, etc.).

Figure 2:
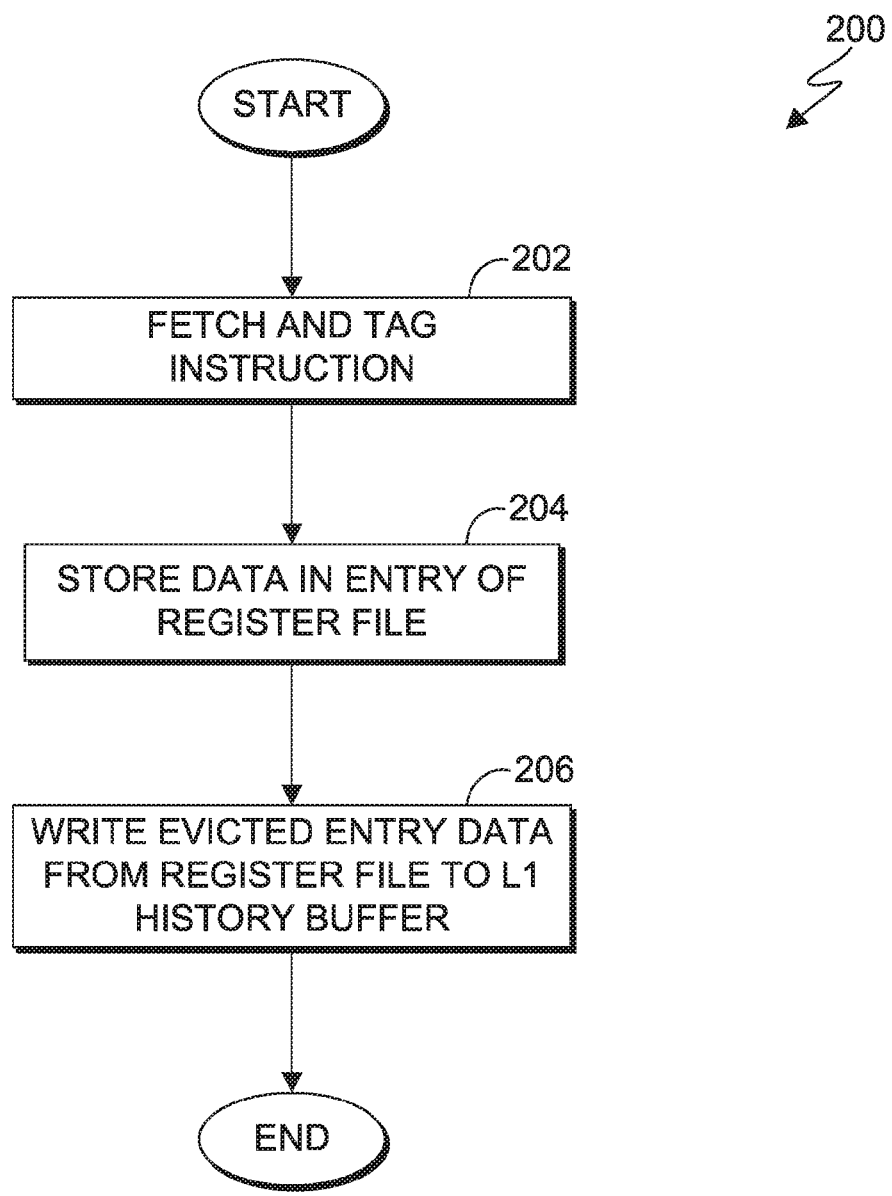
FIG. 2 is a flowchart illustrating operational steps of a program performed by a computer system for evicting entry data from a register file, in accordance with an embodiment of the present invention.

FIG. 2 is a flowchart 200 illustrating operational steps of a program performed by computer system 101 for evicting entry data from register file 104, in accordance with an embodiment of the present invention. In an embodiment, each entry in register file 104 includes an ITAG for a tagged instruction, and the tagged instruction (i.e., entry data). Accordingly, by performing operational steps described herein, evicted entry data in register file 104 are transmitted to one or more designated entries of L1 HB 118. Furthermore, operational steps described herein, performed by computer system 101 may also be performed by one or more modules present on computer system 101.

In step 202, computer system 101 fetches a first instruction and tags the instruction with an ITAG. In an embodiment, instruction fetch unit 102 fetches the first instruction and tags the first instruction with an ITAG using a program counter. For example, instruction fetch unit 102 may fetch the first instruction from program memory. Subsequently, computer system 101 signals instruction fetch unit 102 to dispatch the ITAG and the tagged first instruction to register file 104.

In step 204, computer system 101 stores the tagged first instruction and the ITAG for the tagged first instruction into an entry of register file 104. In an embodiment, the entry of register file 104 contains older entry data (i.e., a tagged instruction and an ITAG for the tagged instruction dispatched at a previous time). Accordingly, register file 104 evicts the older entry data to make the entry available, and subsequently stores the tagged first instruction and ITAG for the tagged first instruction.

In step 206, computer system 101 writes evicted entry data (e.g., older entry data that was evicted from an entry of register file 104) to an entry of L1 HB 118. In an embodiment, computer system 101 includes an evictor ITAG in the entry of L1 HB 118 containing evicted entry data. In another embodiment, the entry of register file 104 does not contain older entry data (i.e., an empty entry of register file 104). In this instance, computer system 101 stores the tagged first instruction and ITAG for the tagged first instruction in the empty entry of register file 104.

It should be understood, that in certain embodiments, entry data may be written directly to an entry of L2 HB 120 based on fulfillment of a condition, such as appropriate circuit timing of computer system 101, result data for a tagged instruction is generated and the tagged instruction is stored in an entry of register file 104, etc.

Figure 3:
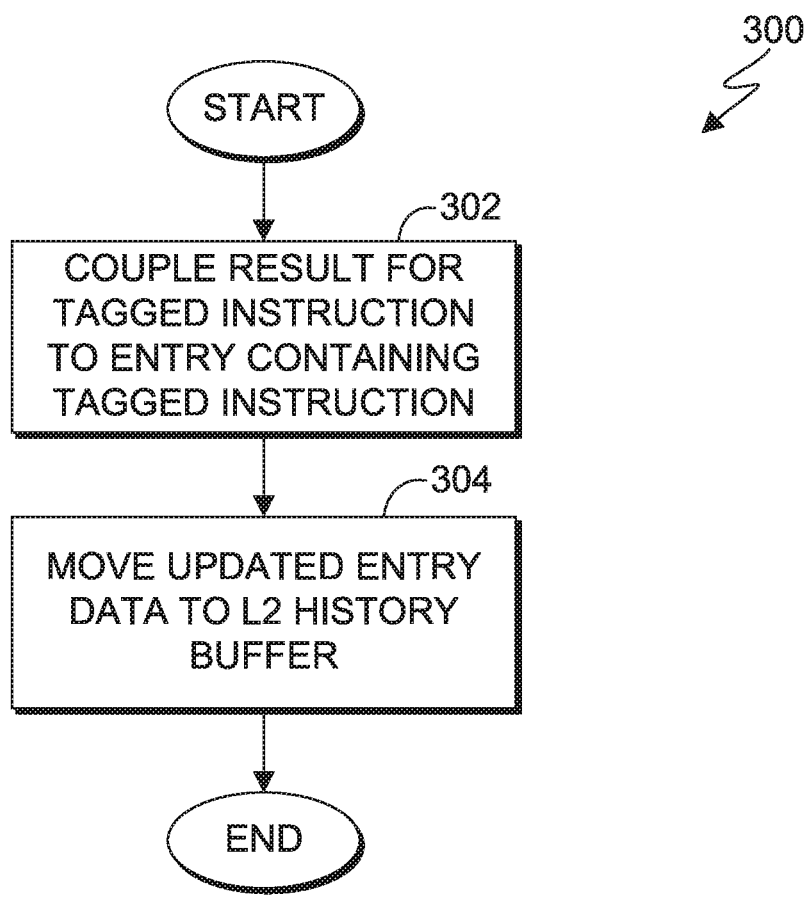
FIG. 3 is a flowchart illustrating operational steps of a program performed by a computer system for coupling a result for a tagged instruction to an entry containing the tagged instruction, in accordance with an embodiment of the present invention.

FIG. 3 is a flowchart 300 illustrating operational steps of a program performed by computer system 101 for coupling a result for a tagged instruction to an entry containing the tagged instruction, in accordance with an embodiment of the present invention. Execution unit 106 generates a result data for a tagged instruction. In an embodiment, the tagged instruction is stored in an entry of L1 HB 118. In this instance, execution unit 106 writes the generated result data for the tagged instruction to the entry of L1 HB 118 containing the tagged instruction. In another embodiment, the tagged instruction may be stored in an entry of register file 104 because the entry in register file 104 containing the tagged instruction was not previously evicted. In this instance, execution unit 106 writes the generated result data for the tagged instruction to the entry of register file 104 containing the tagged instruction. Furthermore, in this instance, the entry of register file 104 containing the newly written result data for the tagged instruction and the tagged instruction (i.e., entry data) is moved to either L1 HB 118 or L2 HB 120. Furthermore, operational steps described herein, performed by computer system 101 may also be performed by one or more modules present on computer system 101.

In step 302, computer system 101 couples the generated result for a tagged instruction to an entry of register file 104 or an entry of L1 HB 118 containing the tagged instruction. In an embodiment, computer system 101 analyzes entries of register file 104 and L1 HB 118 to identify the entry containing the tagged instruction. For example, an entry of register file 104 may contain entry data such as, "instruction B" and "ITAG B." In this instance, subsequent generating a result, "result B," for the tagged instruction, "instruction B," computer system 101 identifies the entry in register file 104 containing "instruction B" and "ITAG B," and couples the generated result for "instruction B" to the entry in register file 104. Accordingly, computer system 101 updates an entry of register file 104 or L1 HB 118 with result data subsequent to executing a tagged instruction stored in the entry and generating a result for the tagged instruction via execution unit 106. Furthermore, computer system 101 may utilize control logic to confirm that a result for a tagged instruction was generated from execution unit 106. For example, computer system 101 may issue a "set data v=1" in control logic to indicate successful generation of a result.

In step 304, computer system 101 moves the updated entry data from an entry of either register file 104 or an entry of L1 HB 118. In an embodiment, the updated entry from either register file 104 or L1 HB 118 is the entry containing the newly coupled result (step 302). As previously discussed, entry data for an entry of L1 HB 118 differs from entry data for an entry of register file 104. For example, entry data in an entry of L1 HB 118 includes an evictor ITAG, whereas entry data in an entry of register file 104 does not include an evictor ITAG. Accordingly, an ITAG for a tagged instruction, the tagged instruction, the result for the tagged instruction, and, when moving an entry of L1 HB 118, the evictor ITAG for the tagged instruction, are moved to an entry of L2 HB 120.

It should be understood that, in certain embodiments, entries of L2 HB 120 and entries of L1 HB 118 may reach a maximum storage capacity. In this instance, dispatch logic may be issued by computer system 101 indicating to components therein (e.g., instruction fetch unit 102) to modify operations. For example, the modified operations may include to throttle fetching instructions until entries of L1 HB 118 and entries of L2 HB 120 are not at a maximum storage capacity.

Figure 4:
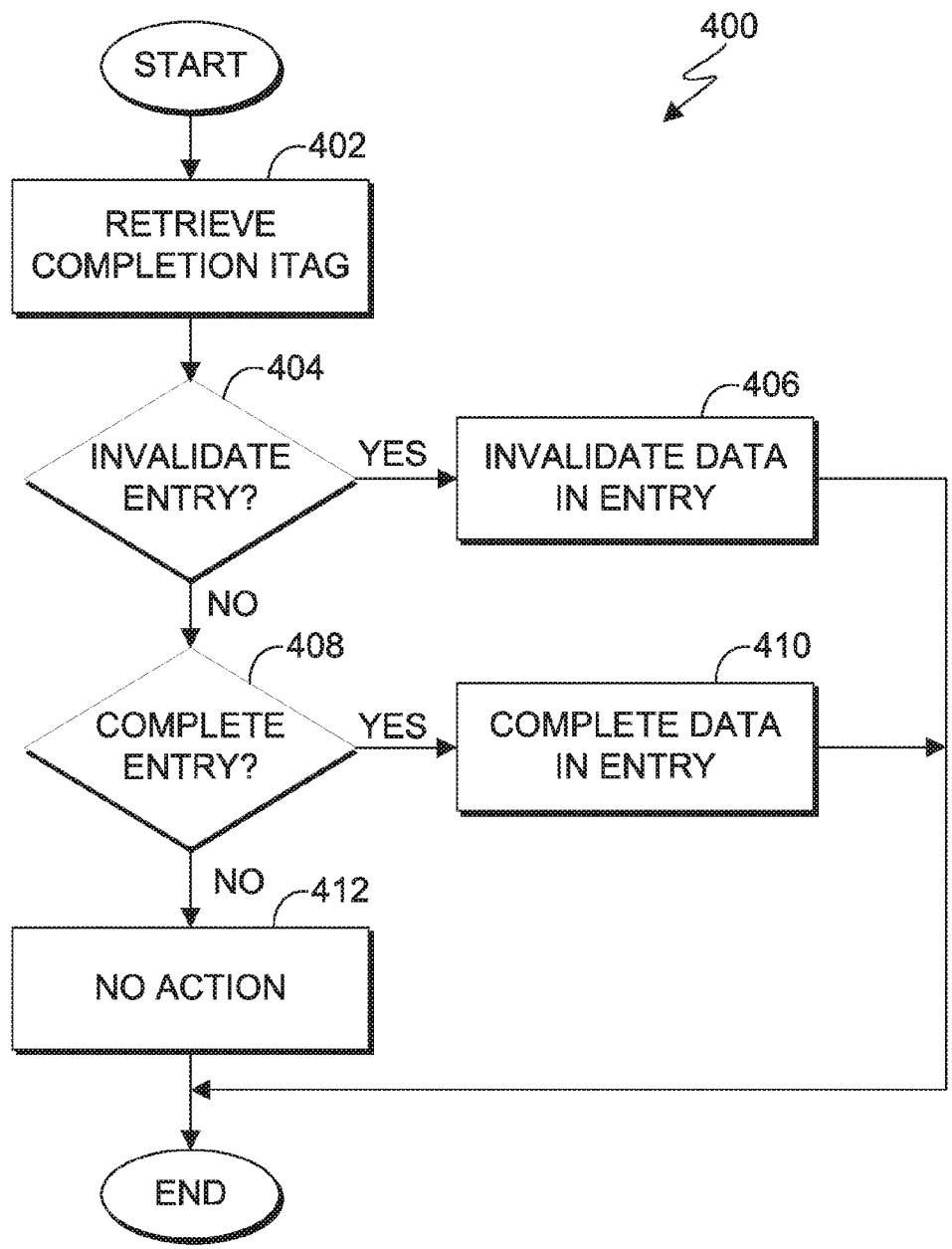
FIG. 4 is a flowchart illustrating operational steps of a program performed by a computer system for completing entry data, in accordance with an embodiment of the present invention.

FIG. 4 is a flowchart 400 illustrating operational steps of a program performed by computer system 101 for completing entry data, in accordance with an embodiment of the present invention. In an embodiment, entry data stored in one or more entries of L2 HB 120 are to be completed. In another embodiment, data stored in one or more entries of L1 HB 118 can be completed. Computer system 101 may implement a component, such as an instruction completion unit (ICU), to determine whether completion for entry data stored in one or more entries is successful. Upon determining completion is successful, the ICU broadcasts a completion ITAG to computer system 101 and components therein (e.g., register file 104, L1 HB 118, L2 HB 120, etc.). The phrase, "completion ITAG," as used herein, refers to an ITAG for indicating that entry data of one or more entries are complete. Furthermore, operational steps described herein, performed by computer system 101 may also be performed by one or more modules present on computer system 101.

In step 402, computer system 101 retrieves a completion ITAG. In one embodiment, computer system 101 implements an ICU to broadcast a completion ITAG. Furthermore, the ICU broadcasts the completion ITAG once the component determines that one or more executed instructions are complete (i.e., a result for a tagged instruction has been generated and coupled to an entry). In another embodiment, status bit information is updated to indicate that the instruction associated with an entry is complete. For example, the status bit information may include a "valid status" indicator which indicates that the instruction associated with the entry is complete.

In step 404, computer system 101 determines whether to invalidate data contained in one or more entries. In one embodiment, computer system 101 may determine to invalidate entry data stored in one or more entries of L2 HB 120. In certain embodiments, computer system 101 may determine to invalidate entry data stored in one or more entries of L1 HB 118. In an embodiment, computer system 101 compares an evictor ITAG with retrieved completion ITAG to determine whether to invalidate data contained in the one or more entries. In this instance, a comparison between the evictor ITAG with the retrieved completion ITAG results in either validating or invalidating the entry. For example, if an evictor ITAG is older than a completion ITAG, then the comparison may indicate that result data for one or more tagged instructions stored in the one or more entries of L2 HB 120 have been previously completed, or are no longer needed, and therefore require invalidation. In another example, if the evictor ITAG is younger than a completion ITAG, then the comparison may indicate that result data for one or more tagged instructions stored in the one or more entries of L2 HB 120 are not yet complete, or still needed for consequent processing, and therefore remain valid. Accordingly, each of the one or more entries in L2 HB 120, and in some embodiments, each of the one or more entries in L1 HB 118 are analyzed to determine whether to invalidate data contained in one or more entries.

If in step 404, computer system 101 determines to invalidate the entry data contained in the one or more entries ("yes" branch), then in step 406, computer system 101 invalidates the entry data contained in the one or more entries. In an embodiment, computer system 101 determines that the completion ITAG is newer (i.e., younger) than an evictor ITAG for a particular entry. Accordingly, computer system 101 determines that data stored in the particular entry requires invalidation. For example, "instruction A" may be an instruction fetched at a first time, tagged by "HB ITAG A", and "instruction B" may be an instruction fetched at a later time, tagged by "HB ITAG B" (step 202 of FIG. 2). Furthermore, an entry of register file 104 containing "HB ITAG A" is evicted by "HB ITAG B" to an entry of L1 HB 118. Once result data "result data A" is written to the entry of L1 HB 118, the entry data, including the result data (i.e., updated entry data), moves to an entry of L2 HB 120. The updated entry data may include, "HB ITAG A," "evictor ITAG B," and "result data A." Accordingly, computer system 101 compares "completion ITAG A" with "evictor ITAG B" and determines to invalidate the entry data contained in the entry of L2 HB 120.

If in step 404, computer system 101 determines to not invalidate the entry data contained in the one or more entries ("no" branch), then in step 408, computer system 101 determines whether to complete entry data contained in one or more entries. In one embodiment, computer system 101 may determine to complete entry data stored in one or more entries of L2 HB 120. In various other embodiments, computer system 101 may determine to complete entry data stored in one or more entries of L1 HB 118. In an embodiment, computer system 101 compares an HB ITAG with the broadcasted completion ITAG to determine whether to complete entry data contained in the one or more entries. For example, if an HB ITAG is older than a completion ITAG, then a comparison may indicate that result data for one or more tagged instructions stored in the one or more entries of L2 HB 120 are to be completed (i.e., result data for a consecutive sequence of tagged instructions have been generated and are error free). In another example, if the HB ITAG is younger than a completion ITAG, then the comparison may indicate that result data for one or more tagged instructions stored in the one or more entries of L2 HB 120 are not ready for completion. Furthermore, all entries in L2 HB 120, and in some embodiments, all entries in L1 HB 118 are analyzed to determine whether to complete entry data contained in one or more entries.

If in step 408, computer system 101 determines to complete the entry data contained in the one or more entries ("yes" branch), then in step 410, computer system 101 completes the entry data contained in the one or more entries. In an embodiment, computer system 101 determines that a completion ITAG is newer (i.e., younger) than an HB ITAG for a particular entry and that the completion ITAG is newer than an evictor ITAG for the particular entry. Accordingly, computer system 101 determines that entry data stored in the particular entry requires completion. For example, "instruction B" may be an instruction fetched at a first time, tagged by "HB ITAG B" and "instruction C" may be an instruction fetched at a later time, tagged by "HB ITAG C." In an embodiment, an entry in register file 104 containing "HB ITAG B" is evicted by "HB ITAG C" to an entry of L1 HB 118. Once result data, "result data B" is written to the entry of L1 HB 118 (i.e., updating entry data), the updated entry data moves to an entry of L2 HB 120. The updated entry data may include, "HB ITAG B," "evictor ITAG C," and "result data B." Computer system 101 compares "completion ITAG C" with "HB ITAG B" and determines to complete the updated entry data contained in the entry. In this instance, the completion process indicates that result data for a consecutive sequence of tagged instructions have been generated and are error free, and are to be used by computer system 101 for a particular operation associated with the completed, tagged instructions.

If in step 408, computer system 101 determines to not complete the entry data contained in the one or more entries ("no" branch), then in step 412, computer system 101 performs no action to the entry data contained in the one or more entries.

Figure 5:
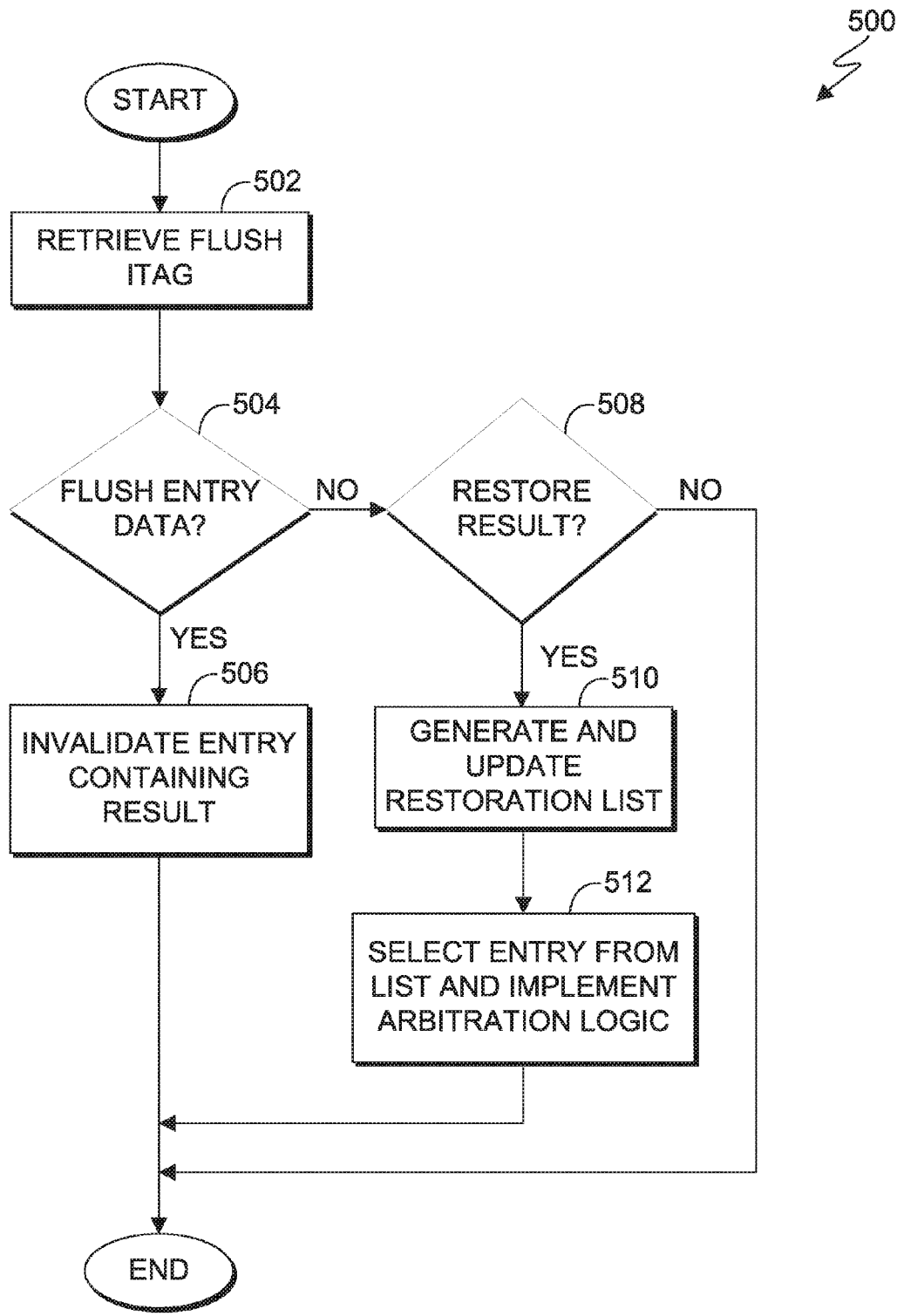
FIG. 5 is a flowchart illustrating operational steps of a program performed by a computer system for flushing and restoring a split-level history buffer, in accordance with an embodiment of the present invention.

FIG. 5 is a flowchart 500 illustrating operational steps performed by computer system 101 for flushing and restoring a split-level history buffer, in accordance with an embodiment of the present invention. In one embodiment, each entry of L2 HB 120 and L1 HB 118 contains entry data, such as, HB ITAG, evictor ITAG, additional status bits, and in some instances, result data. In one embodiment, computer system 101 determines whether to perform a flush operation, based on varying factors. For example, the factors may include whether a branch mis-prediction occurred, a load miss occurred, or an exception occurred. Furthermore, once the component determines that a flush operation is initiated, the component broadcasts a flush ITAG to computer system 101 and components therein (e.g., register file 104, L1 HB 118, L2 HB 120, etc.). It should be understood that a restoration operation may be initiated on either L1 HB 118 and/or L2 HB 120. Furthermore, unique restoration lists are separately generated and updated for L1 HB 118 and L2 HB 120. Accordingly, computer system 101 may implement arbitration logic to determine a manner in which to initiate a restoration operation for either L1 HB 118 and/or L2 HB 120. Furthermore, operational steps described herein performed by computer system 101 may also be performed by one or more modules present on computer system 101.

In step 502, computer system 101 retrieves a flush ITAG. In one embodiment, a component implemented by computer system 101 broadcasts a flush ITAG once the component determines a flushing operation is required. In another embodiment, status bit information is updated to indicate flushing is required for one or more entries of L2 HB 120. For example, the status bit information may include a "flush status" indicator which indicates analysis of the entry to determine whether the entry is to be flushed.

In step 504, computer system 101 determines whether to flush the entry data for a particular entry stored in either L1 HB 118 and/or L2 HB 120. In an embodiment, computer system 101 compares the flush ITAG with the evictor ITAG and the HB ITAG. In an embodiment, L1 HB 118 and L2 HB 120 independently compare each ITAG to determine if a flush cycle is required for the entry data contained in an entry of either L1 HB 118 or L2 HB 120. If the HB ITAG is newer than or equal to the flush ITAG, then computer system 101 determines to flush the entry data for a particular entry stored in either L1 HB 118 and/or L2 HB 120.

If in step 504 computer system 101 determines to flush the entry data for the particular entry stored in either L1 HB 118 and/or L2 HB 120 ("yes" branch), then in step 506 computer system 101 invalidates entry data contained in the particular entry. Accordingly, by invalidating entry data contained in the particular entry, computer system 101 flushes entry data contained in the particular entry.

If in step 504 computer system 101 determines not to flush the entry data for a particular entry stored in either L1 HB 118 and/or L2 HB 120 ("no" branch), then in step 508 computer system 101 determines whether to restore the entry data for a particular entry of either L1 HB 118 and/or L2 HB 120. In an embodiment, computer system 101 compares the flush ITAG, the HB ITAG, and the evictor ITAG to determine whether to initiate a restore cycle. Furthermore, if the evictor ITAG is newer than or equal to the flush ITAG, which is newer than the HB ITAG, then computer system 101 initiates a restore cycle. It should be understood, that computer system 101 determines whether to restore the entry data for each entry of either L1 HB 118 and/or L2 HB 120 if a determination was made to not flush the entry data.

If in step 508, computer system 101 determines to restore the entry data for a particular entry of L1 HB 118 and/or L2 HB 120 ("yes" branch), then in step 510, computer system 101 generates and updates a restoration list which includes a list of entries requiring a restore operation. In an embodiment, computer system 101 updates the restoration list in response to a previous determination (step 508). A restoration list may correspond to L1 HB 118 and another restoration list may correspond to L2 HB 120. In an embodiment, the restoration operation is implemented to repopulate register file 104 with an entry from either L1 HB 118 and/or L2 HB 120, subsequent to a flush operation. In one embodiment, the restoration list corresponding to L1 HB 118 includes one or more entries that meet a restore condition, as described in step 508.

If in step 508, computer system 101 determines not to restore the entry data for a particular entry of L1 HB 118 and/or L2 HB 120 ("no" branch), then operational steps described in flowchart 500 are terminated.

In step 512, computer system 101 selects an entry from the restoration list and implements arbitration logic. In an embodiment, entries from the restoration list are selected sequentially, and the arbitration logic allows the restoration cycle to proceed. For example, if an entry of L1 HB 118 is included the restoration list, then the entry data of the entry in L1 HB 118 is read, the restore operation is executed, and the entry data invalidated. In this instance, reservation stations 110 and 114 are capable of handling a restore cycle (i.e., execution unit 106 is not experiencing a large load). In another example, if an entry of L2 HB 120 is included in the restoration list, but no entry of L1 HB 118 is included in the restore list, then the entry data of the entry in L2 HB 120 is read, the restore operation is executed, and the entry data is invalidated. Similarly, in this instance, reservation stations 110 and 114 are capable of handling a restore cycle. In yet another example, if reservation stations 110 and 114 are not ready to execute a restore operation, then the restoration list and respective entries are unchanged. In this instance, computer system 101 waits for a next restoration cycle.

Figure 6:
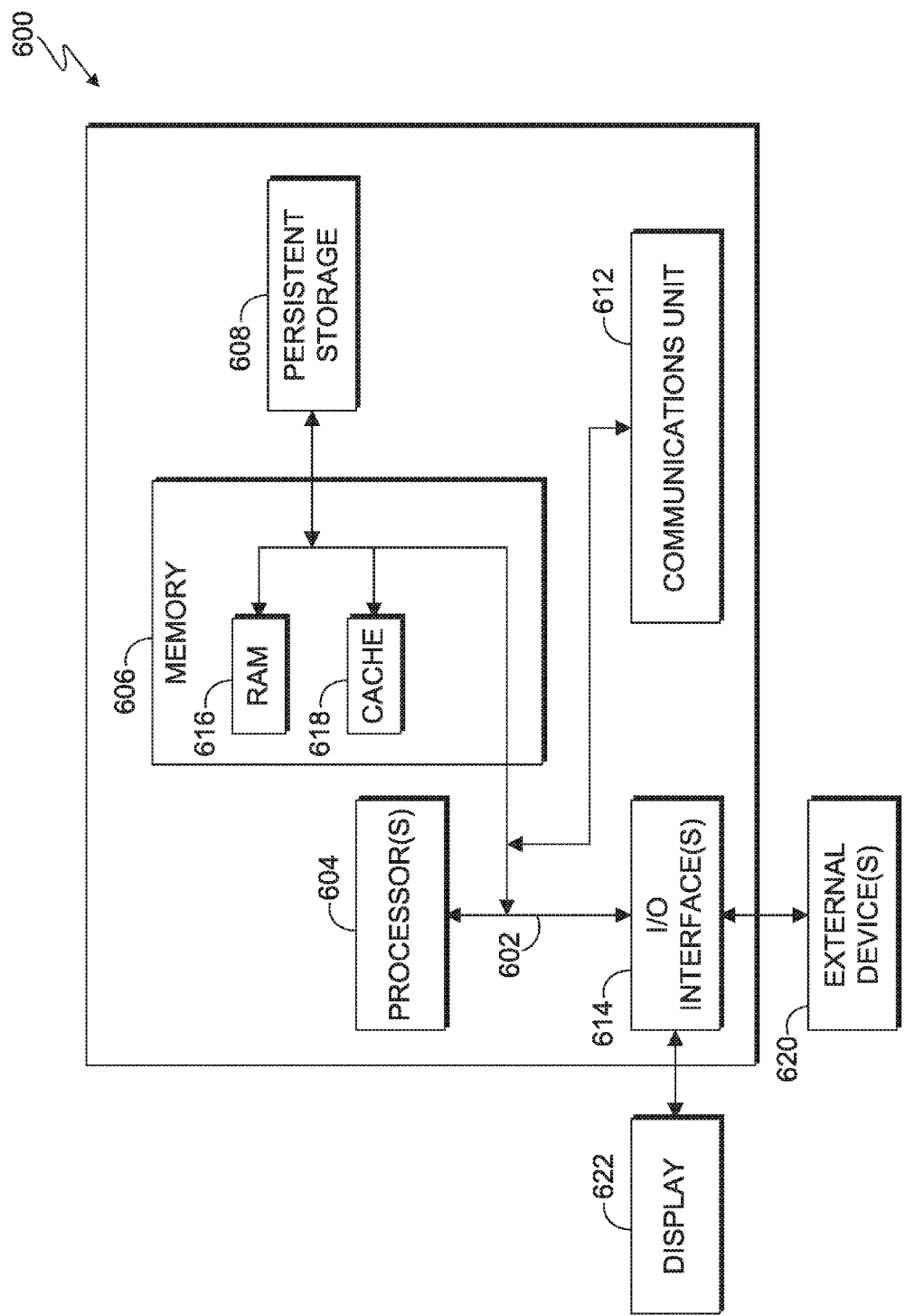
FIG. 6 is a block diagram of internal and external components of the computer system of FIG. 1, in accordance with an embodiment of the present invention.

FIG. 6 is a block diagram of internal and external components of a computer system 600, which is representative of computer system 101 of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In an embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network. In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to a computer system through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620 such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A central processing unit (CPU), the CPU comprising:

a history buffer, wherein the history buffer is split into a first portion and a second portion;

an instruction fetch unit, wherein the instruction fetch unit fetches an instruction and tags the instruction with a unique tag;

a register file, wherein the register file stores the instruction fetched and tagged by the instruction fetch unit;

an execution unit, wherein the execution unit generates a result for the tagged instruction;

one or more computer readable storage media; and program instructions stored on the one or more computer readable storage media for execution by one or more computer processors, the program instructions to:

fetch a first instruction;

tag the first instruction;

store the first instruction in an entry of the register file;

fetch a second instruction;

tag the second instruction;

evict the first instruction from the entry of the register file and store the second instruction in the entry of the register file;

responsive to evicting the first instruction, store the first instruction in the first portion of the history buffer;

generate a result for the first instruction;

responsive to generating the result for the first instruction, move the first instruction from the first portion of the history buffer by storing the first instruction including the generated result for the first instruction in the second portion of the history buffer;

determine whether a third instruction evicts the second instruction from the entry of the register file; and responsive to determining that the third instruction evicts the second instruction from the entry of the register file, store the second instruction in the first portion of the history buffer.

* * * * *